J. M. READ.
Spider.

No. 216,346.   Patented June 10, 1879.

Witnesses

Inventor
Josiah M. Read,
by A. H. Evans & Co.
his attorneys

UNITED STATES PATENT OFFICE.

JOSIAH M. READ, OF BOSTON, MASSACHUSETTS.

IMPROVEMENT IN SPIDERS.

Specification forming part of Letters Patent No. 216,346, dated June 10, 1879; application filed September 20, 1878.

*To all whom it may concern:*

Be it known that I, J. M. READ, of the city of Boston, in the county of Suffolk and Commonwealth of Massachusetts, have invented an Improved Spider, and other like cast-metal vessels, of which the following is a specification.

My invention relates to spiders and other similar vessels used in cooking; and it consists in providing a handle adapted to the grasp of the hand, while at the same time it is cast hollow in one piece with the vessel.

To enable others skilled in the art to make and use my invention, I will proceed to describe the exact manner in which I have carried it out.

Figure 1:
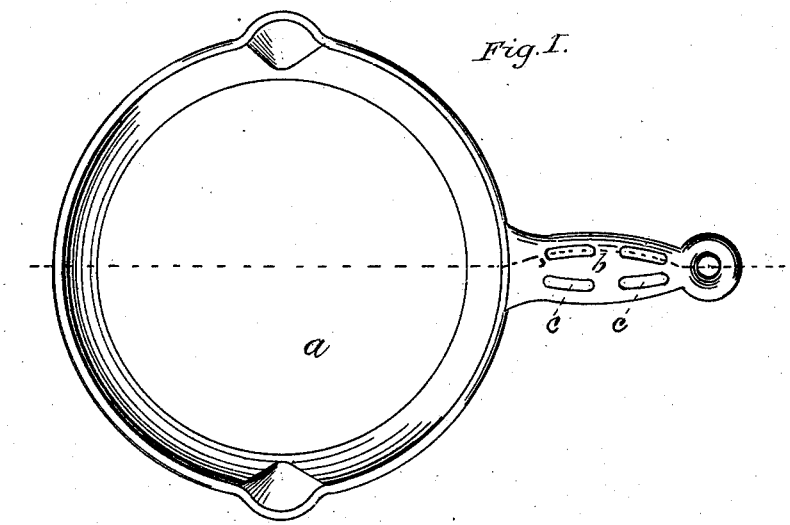
Figure 3:
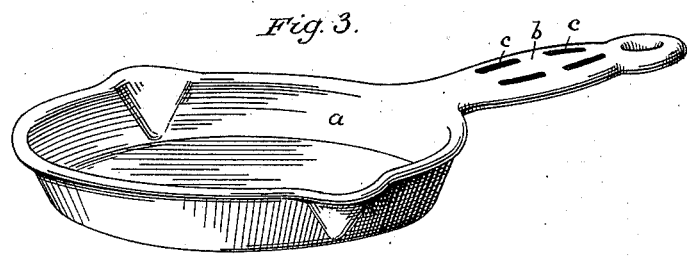
Figure 2:
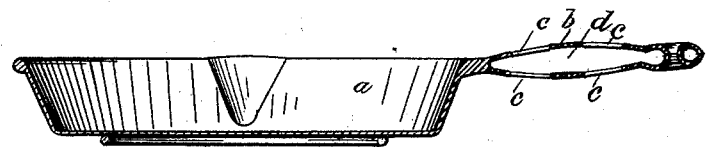

In the drawings, Figure 1 is a plan of a spider having my attachment, and Fig. 2 is a cross-section thereof. Fig. 3 is a perspective view of a spider with my improvement attached.

Spiders and other similar vessels as heretofore made have usually been cast with a partially flat solid handle, which was liable to become quickly heated, and which was exceedingly unpleasant, if not dangerous, to grasp in the hand.

The object of my invention is to overcome this objection and make a handle specially fitted to the hand.

To accomplish this I make the handle with a gentle swell on both vertical and horizontal sections from each end of the handle toward the center, as shown in Figs. 1 and 2, thus enabling the person using the spider to center the grasp of the hand on the point of the greatest strain. The double oval affords an ample protection against any injury to the hand while in the act of lifting, and prevents the handle of the spider from turning in the grasp.

The handle being cast hollow gives a larger grasp for the hand with less weight of metal, and by the openings *c* into the hollow portion of the metal a free circulation of air is allowed within the handle, with a tendency to keep it comparatively cool.

I am aware that hollow cast-metal handles are not new, nor do I claim such as my invention. Hollow metal handles with slots are also old, and are not my invention; but,

Having thus described my invention, what I claim as new, and desire to secure by Letters Patent, is—

As an improved article of manufacture, a cast-iron spider, cast with a hollow and slitted handle, the said handle being oval in both vertical and horizontal section, whereby it is readily and safely grasped by the hand while being lifted.

JOSIAH M. READ.

Witnesses:
F. F. RAYMOND, 2d,
A. J. OETTINGER.